(12) United States Patent
Gullo

(10) Patent No.: US 8,600,907 B2
(45) Date of Patent: Dec. 3, 2013

(54) SYSTEMS AND METHODS FOR PROVIDING AN EXPRESS MAIL LABEL

(75) Inventor: John F. Gullo, Alexandria, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 11/879,000

(22) Filed: Jul. 30, 2007

(65) Prior Publication Data

US 2007/0294194 A1    Dec. 20, 2007

Related U.S. Application Data

(63) Continuation of application No. 10/600,760, filed on Jun. 23, 2003, now abandoned.

(60) Provisional application No. 60/390,991, filed on Jun. 24, 2002.

(51) Int. Cl.
*G06Q 30/00* (2012.01)

(52) U.S. Cl.
USPC .......................................................... 705/333

(58) Field of Classification Search
USPC .......................................................... 705/333
See application file for complete search history.

(56) References Cited

U.S. PATENT DOCUMENTS

| | | | |
|---|---|---|---|
| 5,831,220 A | 11/1998 | Ramsden et al. | |
| 6,042,149 A * | 3/2000 | Roshkoff | 283/67 |
| 6,257,624 B1 * | 7/2001 | Fabel | 283/62 |
| 6,388,764 B2 | 5/2002 | Petkovsek | |
| 6,547,136 B1 | 4/2003 | Sansone | |
| 6,848,615 B2 * | 2/2005 | Yamagami | 235/383 |
| 7,458,612 B1 * | 12/2008 | Bennett | 283/81 |
| 2001/0042052 A1 | 11/2001 | Leon | |
| 2002/0166895 A1 * | 11/2002 | Wiebe et al. | 235/472.01 |
| 2003/0093383 A1 | 5/2003 | Reich et al. | |
| 2003/0101148 A1 * | 5/2003 | Montgomery et al. | 705/404 |
| 2003/0142855 A1 * | 7/2003 | Kuo et al. | 382/119 |
| 2005/0038758 A1 * | 2/2005 | Hilbush et al. | 705/402 |
| 2008/0133372 A1 * | 6/2008 | Ramsden et al. | 705/17 |
| 2009/0204522 A1 * | 8/2009 | Meyer et al. | 705/34 |
| 2010/0332284 A1 * | 12/2010 | Hilbush et al. | 705/9 |

OTHER PUBLICATIONS http://help.sap.com/saphelp_45b/helpdata/en/52/6dec6eb435d1118b3f0060b03ca329/frameset.htm, Mar. 6, 2001.*
http://help.sap.com/saphelp_45b/saphelp/en/dd/8e51341a06084de10000009b38f83b.com.*
Postal Bulletin, PB 22053, www.usps.com/cpim/ftp/bulletin/2001/pb22053.pdf, Jun. 28, 2001.
PCT International Search Report mailed Oct. 14, 2003.

* cited by examiner

*Primary Examiner* — Allen J Jung
(74) *Attorney, Agent, or Firm* — Finnegan, Henderson, Farabow, Garrett & Dunner LLP

(57) ABSTRACT

Systems and methods are provided for generating a mailing label. In one embodiment, a method includes requesting, through a communication channel, a tracking number for the mailing label, wherein the tracking number identifies that the mailing label is printable by a user on a single-sheet medium; receiving, through the communication channel, a response to said request, such that the response includes the tracking number provided by a source of one or more tracking numbers; and enabling the user to print the mailing label with the received tracking number.

54 Claims, 6 Drawing Sheets

FIG. 4

SYSTEMS AND METHODS FOR PROVIDING AN EXPRESS MAIL LABEL

CROSS REFERENCE TO RELATED APPLICATION

This is a continuation of U.S. patent application Ser. No. 10/600,760, filed Jun. 23, 2003 now abandoned, which claims the benefit of U.S. Provisional Patent Application No. 60/390,991, entitled "EXPRESS MAIL LABEL DESIGN," filed on Jun. 24, 2002, the disclosures of which are expressly incorporated herein by reference in their entirety.

BACKGROUND

I. Technical Field

The present invention generally relates to mailing labels. More particularly, systems and methods are provided for enabling a user to produce an Express Mail label, such that the Express Mail label is printable by the user on a single-sheet label.

II. Background Information

Express Mail is the U.S. Postal Service's (USPS) premier service and offers guaranteed next-day and second-day delivery service 365 days a year, including weekends and holidays. Letters, documents, merchandise, and packages may be sent using Express Mail, with a refund provided to the sender if the shipment is delivered later than the guaranteed delivery date.

Currently, a user mailing a letter or package is required to use a USPS multiple sheet Express Mail label, such as USPS Label 11-B. These labels include four sheets and are thus difficult to automate, since they must be hand-printed or generated on a dot-matrix printer. Because most users prefer laser or thermal printers, these multiple sheet labels cannot be used.

Accordingly, there is a need to allow users to print black and white, single-sheet labels online for all USPS product lines (i.e., overnight, second-day, and ground service). Moreover, there is also a need to allow users to automate their mailing operations and print shipping labels directly from local or network printers.

SUMMARY OF THE INVENTION

Accordingly, the present invention is directed to systems and methods for enabling a user to produce an Express Mail label which is printable by a user on a single-sheet medium.

Systems and methods consistent with the present invention may generate a mailing label, such that the mailing label may be used with a letter or package sent in an express manner. In an embodiment, systems and methods consistent with the present invention may request, through a communication channel, a tracking number for the letter or package, wherein the tracking number identifies that the mailing label is printable by a user on a single-sheet medium, such as a label. Furthermore, systems and methods consistent with the present invention may receive, through the communication channel, a response to the request, such that the response includes the tracking number provided by a source of one or more tracking numbers. In addition, systems and methods consistent with the present invention may enable the user to print, on a single-sheet medium, the mailing label with the received tracking number.

Systems and methods consistent with the present invention may also enable a user to print a computer generated mailing label. In one embodiment, the method may include receiving, through a communication channel, a request for a tracking number; and determining whether the request is for a mailing label that is printable by a user on a single-sheet medium. When the request is for a mailing label that is printable by the user on the single-sheet medium, the method may include determining the tracking number, such that the tracking number includes a unique prefix; storing the determined tracking number; and providing, through the communication channel, the determined tracking number.

Moreover, systems and methods consistent with the present invention may distribute one or more letters or packages. In one embodiment, the method may include delivering a letter with a mailing label; determining that the mailing label includes a tracking number with a two-character prefix, such that the two-character prefix identifies the mailing label as being printed by a user; and sending a delivery indication including the determined tracking number.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects consistent with the present invention and, together with the description, explain the principles of the invention. In the drawings:

FIG. 4 depicts an exemplary customer receipt consistent with the systems and methods of the present invention;

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the present invention enable a user to print Express Mail labels online using a single-sheet medium, such as a pressure-sensitive adhesive form removably affixed to a carrier substrate (e.g., a label). The mailing label includes, inter alia, a tracking number with a unique prefix. The prefix identifies that the label was printed by an online user rather than printed by some other means, such as manually or by a postal facility using multiple sheet labels.

Figure 1:
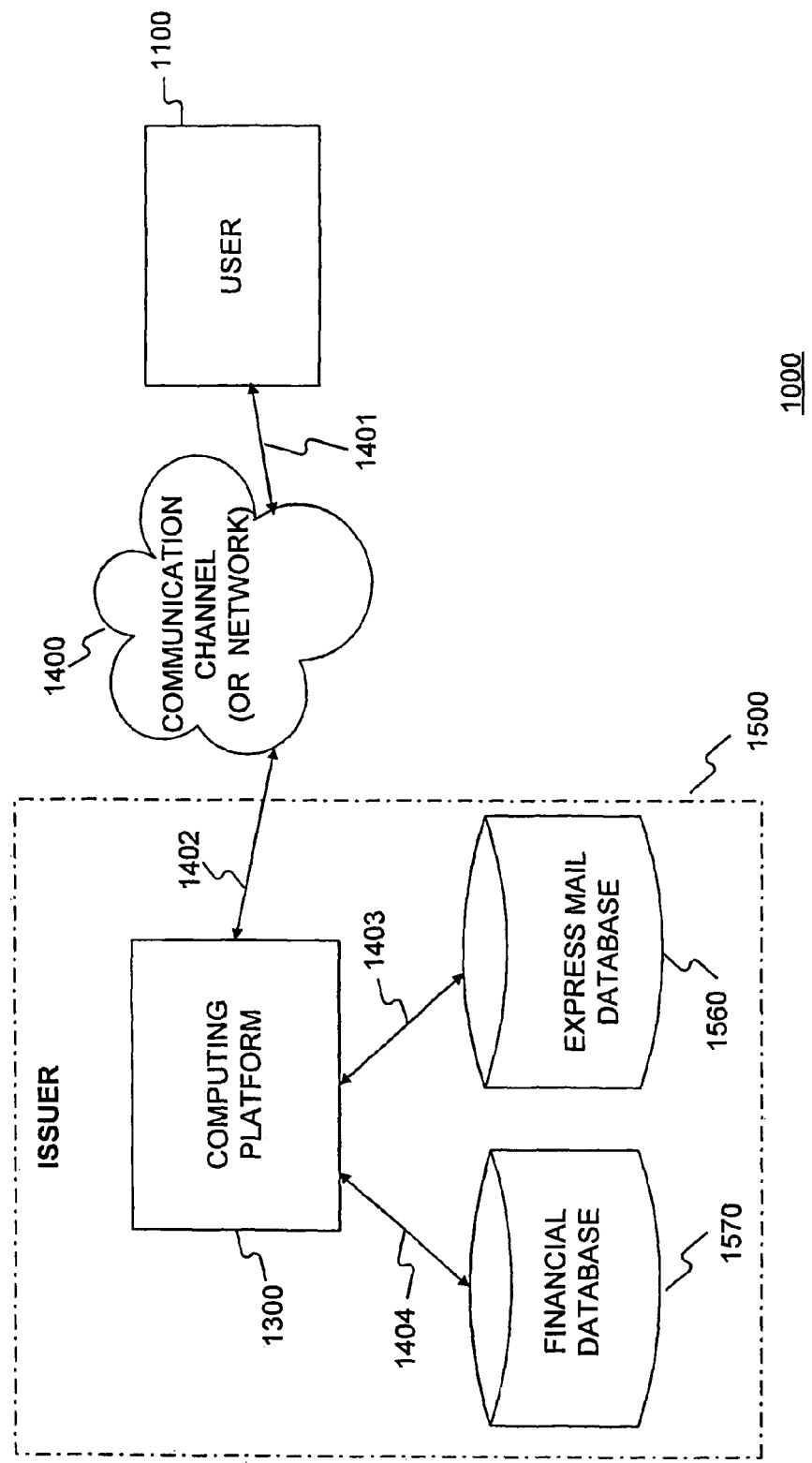
FIG. 1 illustrates an exemplary system environment consistent with the systems and methods of the present invention.

FIG. 1 depicts an exemplary system 1000 that enables a user to print an Express Mail label online (e.g., through a communication channel) using a single-sheet label. Referring to FIG. 1, system 1000 includes a user 1100, one or more communication channels 1400-1404, and an issuer 1500. Issuer 1500 includes a financial database 1570, a computing platform 1300, and an Express Mail database 1560.

User 1100 includes any entity seeking to print an Express Mail label online using a single-sheet medium (or label). User 1100 may include, for example, a consumer home computer, a retail mail kiosk, a retail mail outlet, a mail facility, such as a post office or distribution center, and/or a corporate mail center. Moreover, user 1100 may include one or more processors, as described in detail below. Although only a single user 1100 is depicted in FIG. 1, a plurality users may seek to print mailing labels.

Communication channels 1400-1404 (also referred to herein as "communication channel") may include, alone or in any suitable combination a telephony-based network, a local area network (LAN), a wide area network (WAN), a dedicated intranet, the Internet, a wireless network, a bus, or a backplane. Further, any suitable combination of wired and/or wireless components and systems may be incorporated into the communication channels. Although the communication channels are depicted in FIG. 1 as bi-directional, a skilled artisan would recognize that unidirectional communication links may be used instead.

Issuer 1500 includes any entity that enables a user to generate (or print) single-sheet labels by issuing tracking numbers with a unique prefix to distinguish the user-printed Express Mail labels from any other mailing labels, such as Express Mail labels printed on multiple sheet labels. Issuer 1500 may also include financial database 1570 to record financial transactions. For example, when user 1100 requests a tracking number so that a single-sheet Express Mail label may be printed, user 1100 may provide payment information, such as credit card information, to issuer 1500. Issuer 1500 may then record a credit in financial database 1570 and later record against that credit any payments received from a bank or credit card.

Figure 2:
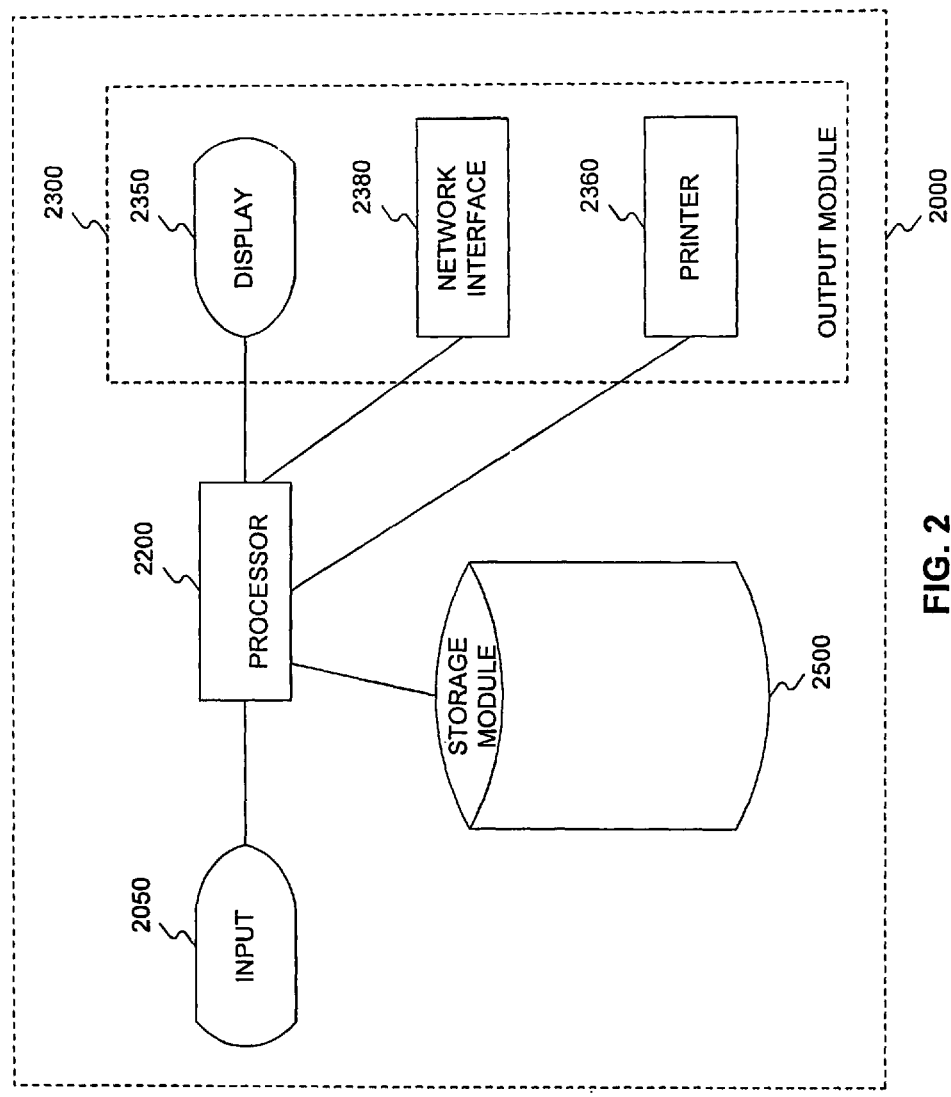
FIG. 2 illustrates an exemplary processor capable of printing a label for a user of the exemplary system of FIG. 1 consistent with the systems and methods of the present invention.

Furthermore, issuer 1500 may include computing platform 1300. FIG. 2 depicts a block diagram of an exemplary computer 2000 that may be used as the computing platform 1300. As noted above, exemplary computer 2000 may also be used by (or included in) user 1100. Computer 2000 includes an input module 2050, a processor 2200, a storage module 2500, and an output module 2300.

Output module 2300 further includes a display 2350, a printer 2360, and a network interface 2380. Network interface 2380 enables computer 2000 to communicate through communication channels 1400-1404.

Input module 2050 of FIG. 2 may be implemented with a variety of devices to receive user input and/or provide input to processor 2200. Some of these devices (not shown) may include, for example, a network interface card, a modem, a keyboard, a mouse, a bar code reader, and an input storage device.

Although FIG. 2 illustrates only a single processor 2200, computer 2000 may alternatively include a plurality of processors. Processor 2200 may also include, for example, one or more of the following: central processing unit, co-processor, memory, registers, and other data processing devices and systems as appropriate. Moreover, computer 2000 (or processor 2200 therein) may be embodied as a wireless or portable device, such as a mobile phone, text messaging device, or personal digital assistant (PDA).

Storage module 2500 may be embodied with a variety of components or subsystems capable of providing storage including, for example, a hard drive, an optical drive, a general-purpose storage device, a removable storage device, and/or memory. Moreover, storage module 2500 may be capable of including databases, such as financial database 1570 or Express Mail database 1560. Further, although storage module 2500 is illustrated in FIG. 2 as being separate or independent from processor 2200, storage module 2500 and processor 2200 may be implemented as part of a single platform or system.

Referring back to FIG. 1, issuer 1500 may include Express Mail database 1560, such that it is available to user 1100 while connected online through the communication channel (or network). Express Mail database 1560 may include tracking numbers for letters and packages, with corresponding additional information. This additional information may include one or more of the following: payment or fee information, a destination address, a user (or sender) address, delivery information (e.g., whether the package has been delivered), originating post office ZIP code, day of delivery (e.g., next day or second day), time of delivery (e.g., by 12 noon or by 3 PM), date and time package or letter provided to post office for mailing, return receipt request, weight of letter or package, weekend or holiday delivery requests, amount of postage, insurance information, and cash on delivery (COD) requests. Moreover, Express Mail database 1560 may provide user 1100 with a tracking number. The tracking number may include a unique prefix, identifying the tracking number as issued to user 1100. In one aspect consistent with the invention, the unique prefix identifies that the tracking number is associated with a mailing label that is printable by a user on a single-sheet mailing label rather than a multiple sheet label. In one embodiment, Express Mail database 1560 is stored on storage module 2500 and is accessible online through communication channels 1400-1403.

Figure 3:
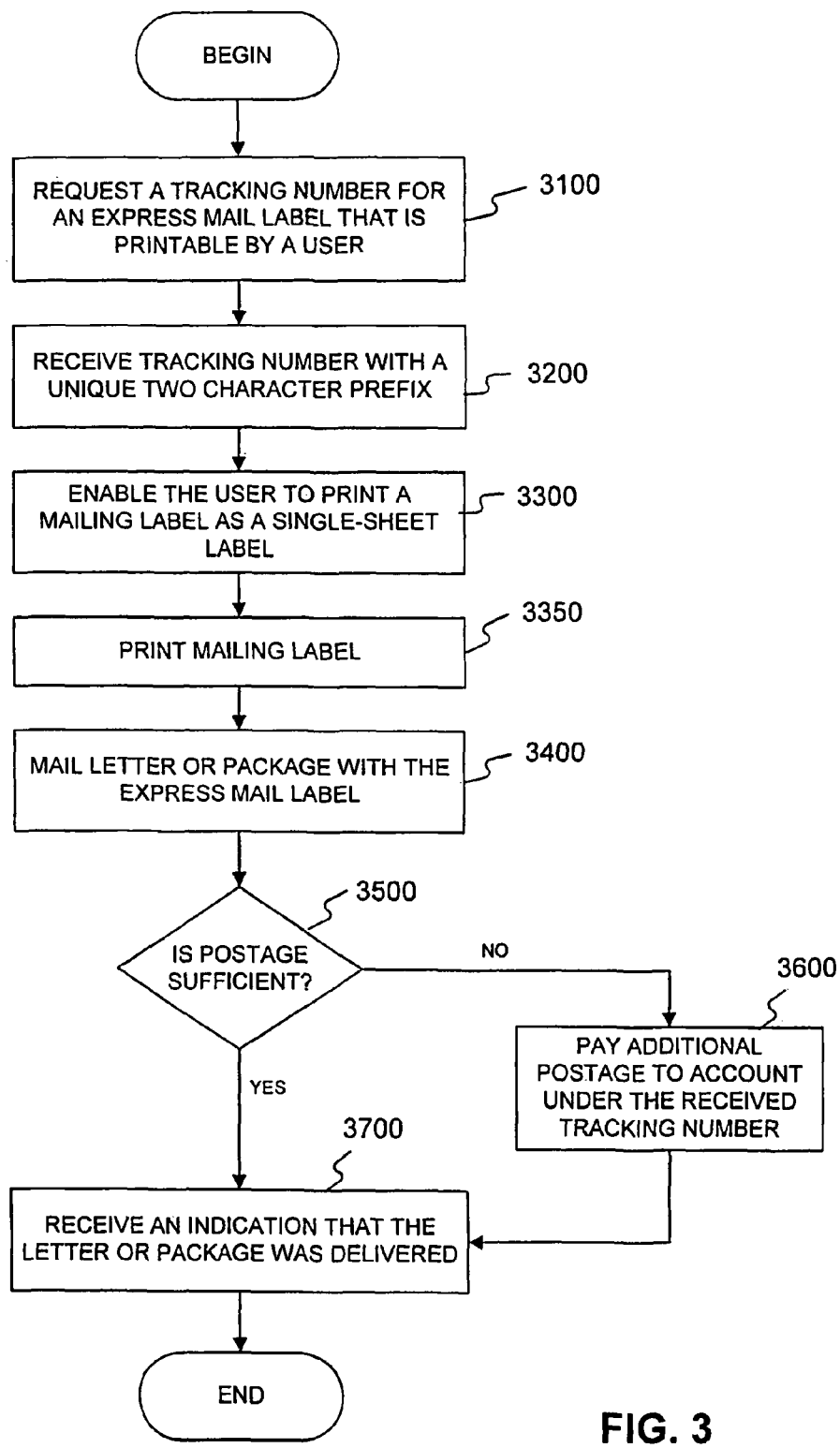
FIG. 3 is an exemplary flowchart for requesting a tracking number consistent with the systems and methods of the present invention.

FIG. 3 depicts an exemplary method where user 1100 makes a request for a tracking number and then prints a single-sheet mailing label for Express Mail delivery. Referring to FIG. 3, user 1100 may request a tracking number for an Express Mail label that is printable by the user (step 3100). User 1100 may then receive a tracking number with a unique two-character prefix, identifying the tracking number as a user generated Express Mail label (step 3200). With the tracking number, user 1100 may be enabled to print on printer 2360 a mailing label using a single-sheet medium, such as an adhesive or self-stick label (step 3300). After printing, the single-sheet mailing label may then be affixed to a letter or package and then mailed, such as via the USPS Express Mail service (steps 3350-3400). If postage is sufficient to mail the letter or package to its destination, the letter or package will be delivered to the address indicated on the mailing label (step 3500). Otherwise, user 1100 may be required to pay additional fees (or postage) (steps 3600). When the package is delivered, user 1100 may receive an indication that the package has been delivered (step 3700). The following provides a more detailed description of steps 3100-3700.

To request a tracking number (step 3100), user 1100 may use an interface, such as an application programming interface, on computer 2000 to request (or solicit) a tracking number from issuer 1500 via communication channels 1400-1403. In one embodiment, the interface is embedded in an Internet browser, permitting the user to make the request using the browser. The request may include an indication that the tracking number is for a user which seeks to print an Express Mail label while connected online through communication channels 1400-1404. The indication may be in any form including, for example, a flag, a bit, a byte, a message, or a signal. The request may also include additional information, such as payment or fee information, a destination address, a user (or sender) address, delivery information (e.g., whether the package has been delivered), originating post office ZIP code, day of delivery (e.g., next day or second day), time of delivery (e.g., by 12 noon or by 3 PM), date and time package or letter was provided to a post office for mailing, return receipt request, weight of letter or package, weekend or holiday delivery requests, amount of postage, insurance information, and COD requests. Issuer 1500 may process the request, which is described in greater detail below with respect to FIG. 6, and provide a tracking number to user 1100.

Figure 4:
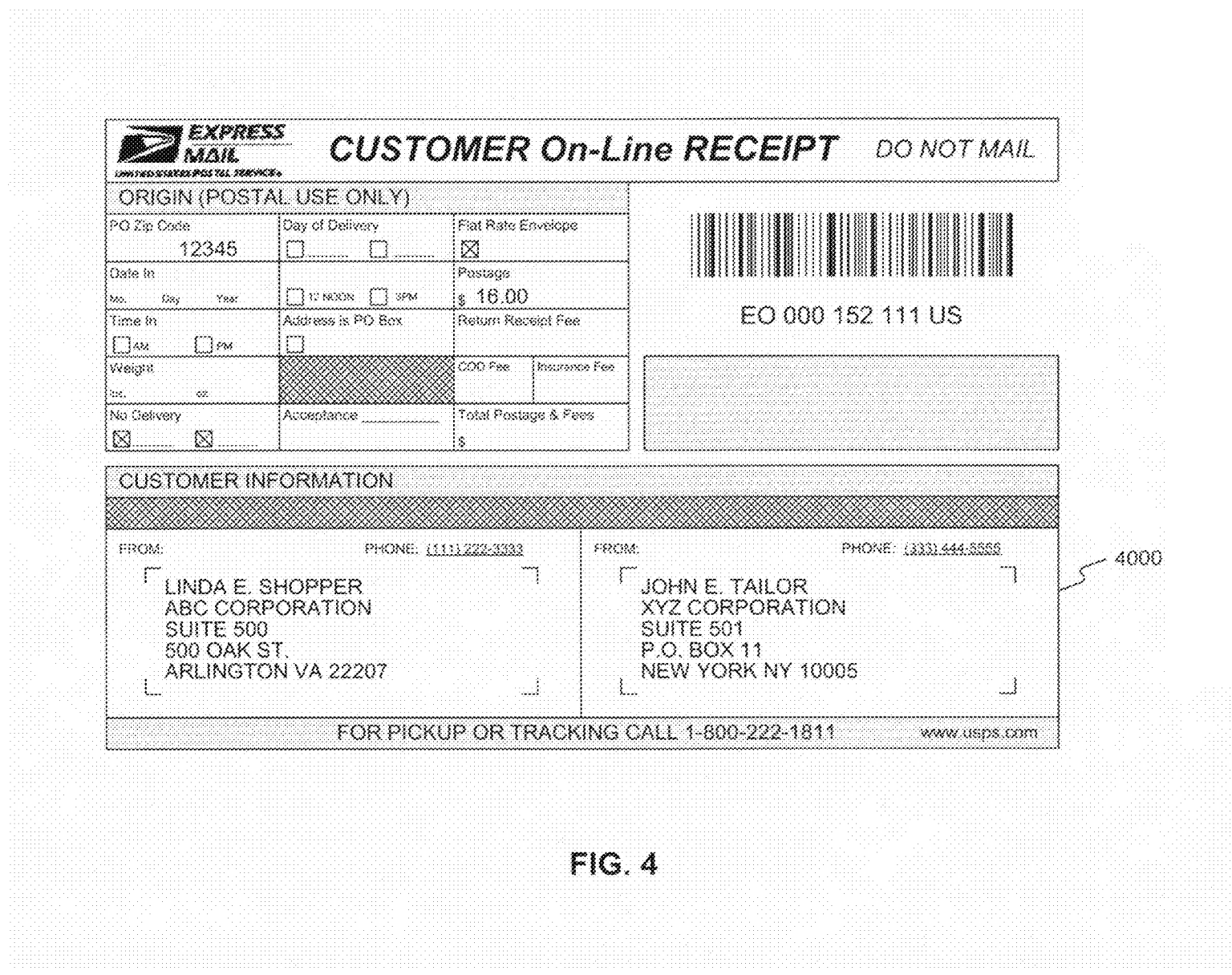

User 1100 (or computer 2000 therein) may receive the tracking number from issuer 1500 via communications channels 1400-1403 (step 3200). In one aspect consistent with the invention, the tracking number may include a two-character prefix. The two-character prefix may identify that the tracking number corresponds to a user-generated mailing label requested online and/or printable by the user on a single-sheet label. The received tracking number may be received with additional information, such as information that enables user 1100 to print the Express Mail label. For example, the tracking number may be received with an indication that postage was paid. When that is the case, the express mailing label may be printed with such postage information. Otherwise, the postage information on the mailing label may be left blank when printed by printer 2360. In addition to the tracking number, user 1100 may receive a receipt from issuer 1500 through communication channels 1400-1404. FIG. 4 depicts an example of the receipt received from issuer 1500. Moreover, user 1100 may receive an image file, such as a ".pdf" file, with the tracking number and any additional information formatted for printing on printer 2360. In one aspect of the invention, the image file and/or the tracking number are not sent to user 1100 until user 1100 pays any fees associated with mailing the letter or package.

In one embodiment, the received tracking number may be received using an interface on computer 2000, such as an application programming interface or an interface (or plug-in) embedded in an Internet browser. For example, the plug-in may be software (or code) for viewing text or image files.

Referring again to FIG. 3, with the received tracking number, issuer 1500 may enable user 1100 to print the Express Mail label using a single-sheet label (step 3300). In one embodiment, user 1100 may be enabled to print the express mailing label when user 1100 receives an image file from issuer 1500. The image file may contain the tracking number that uniquely identifies the mailing label as printable by user 1100. With the image file, user 1100 may print the Express Mail label (step 3350).

Figure 5:
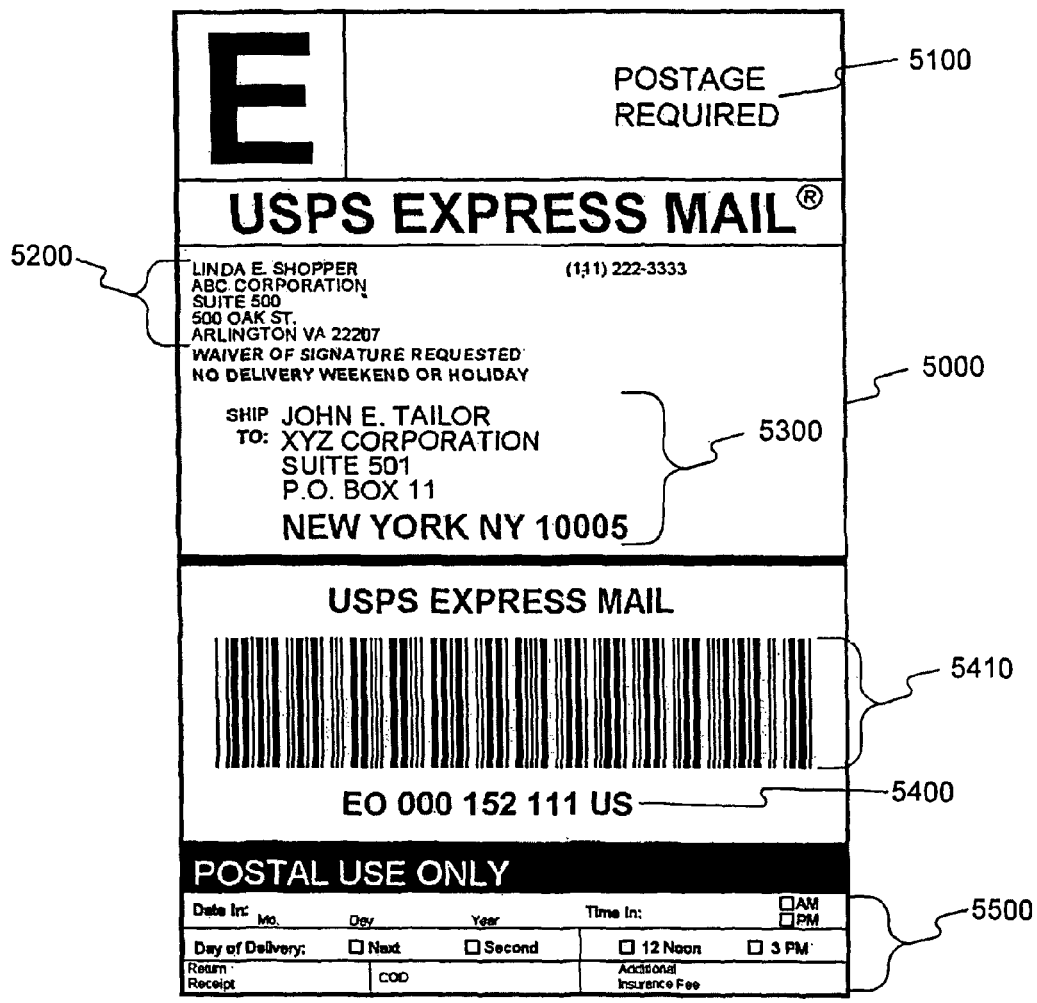
FIG. 5 depicts an exemplary single-sheet mailing label printed by a user consistent with the systems and methods of the present invention.

An exemplary Express Mail label 5000 is depicted in FIG. 5. Referring to FIG. 5, the mailing label is printed on a single-sheet label, not a multi-sheet label. Express Mail label 5000 may include a return address 5200, a destination address 5300, and a tracking number 5400 with a corresponding bar code 5410. Tracking number 5400 includes a unique prefix "EO" to identify label 5000 as an Express Mail label printable by user 1100 on a single-sheet label. The unique prefix may further indicate that the tracking number is received while connected online to issuer 1500. Express Mail label 5000 further includes an indication of whether postage has been "PAID" or is "REQUIRED" 5100. In the case of FIG. 5, postage must be paid in a separate transaction, since postage is still "REQUIRED" 5100. Lastly, label 5000 includes information 5500 for use by issuer 1500 (in this case, the USPS).

In one aspect consistent with the invention, the Express Mail label may be printed using an interface on computer 2000, such as an application programming interface or a plug-in embedded in an Internet browser.

When the Express Mail label is printed, it may then be affixed to a letter or package and mailed, such as via the USPS Express Mail service (step 3400, FIG. 3). In one embodiment, user 1100 may receive a customer receipt 4000, depicted in FIG. 4, from issuer 1500 and provide that receipt 4000 to the USPS (or carrier) for a postmark. The postmarked customer receipt may serve as proof of mailing the letter or package.

If postage is sufficient to mail the letter or package to its destination, the letter or package will be delivered to the address indicated on the Express Mail label (step 3500). In one embodiment, the USPS verifies the weight of the package or letter, and then determines whether sufficient postage has been paid against the tracking number for that package or letter. If postage is insufficient, user 1100 may be required to pay additional fees (step 3600) or, alternatively, the addressee may be required to pay any additional fees on delivery of the package or letter. The user may pay postage online to issuer 1500 or directly to a USPS postal facility.

When the package is delivered, user 1100 may receive an indication that the package or letter has been delivered (step 3700). In one embodiment, the indication is in the form of a message that includes at least one of the following: the tracking number, delivery address, date and time of delivery, and name (or signature) of the person accepting delivery of the package or letter. For example, user 1100 may receive a message or electronic mail (email) from issuer 1500. Alternatively, user 1100 may call (or request) with delivery information from issuer 1500.

Figure 6:
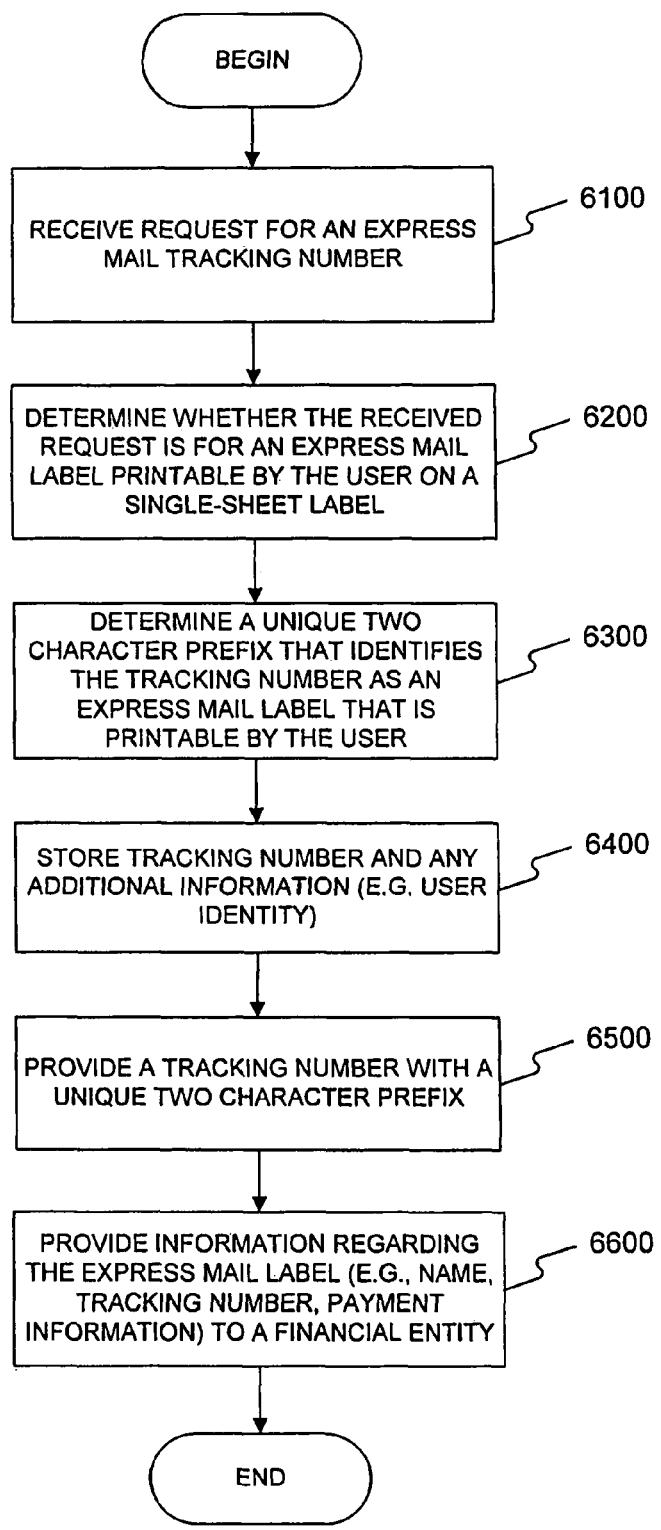
FIG. 6 is an exemplary flowchart for receiving a request for a tracking number and providing a tracking number that enables a user to print a mailing label consistent with the systems and methods of the present invention.

FIG. 6 is an exemplary flowchart depicting the steps associated with issuer 1500 receiving a request (e.g. from user 1100) for a tracking number. Referring to FIG. 6, issuer 1500 may receive a request for a tracking number for an Express Mail label (step 6100). Issuer 1500 may then determine whether the request is for a single-sheet mailing label that is printable by user 1100 while connected online to issuer 1500 (step 6200). If so, issuer 1500 may determine a two-character prefix that identifies the tracking number as being associated with an Express Mail letter (or package) that is printable by user 1100 on a single-sheet label (step 6300). Issuer 1500 may also store the tracking number and any corresponding additional information, such as user identity (step 6400). Issuer 1500 may then provide to user 1100, the tracking number with the two-character prefix (step 6500). The tracking number and corresponding additional information may also be provided to a financial entity, such as a corporate accounting department or database therein, to record a financial transaction associated with the tracking number (step 6600). Steps 6100-6600 are described in additional detail below.

Issuer 1500 (or computing platform 1300 therein) may receive a request for a tracking number from user 1100 through communication channels 1400-1402 (step 6100). For example, computing platform 1300 may include an interface, such as an application programming interface or a plug-in embedded in an Internet browser, that receives the request from user 1100.

Computing platform 1300 may then determine whether the tracking number request is for a single-sheet mailing label that is printable by user 1100 (step 6200). In one embodiment, the request for the tracking number is received from user 1100 and includes, as part of the request, an indication that the request is for a single-sheet mailing label which is printable by user 1100. For example, the request may be made by an interface adapted to make such requests using a Hyper Text Transfer Protocol (http) connection to a website that receives tracking numbers. Alternatively, the request may include information, such as a flag, signal, or text field, indicating that the request is for a single-sheet mailing label which is printable by user 1100. In one embodiment, the tracking number request may be in the form of a TCP/IP (Transport Control Protocol/Internet Protocol) exchange, such as a Simple Object Oriented Protocol (SOAP) or HTTP.

Issuer 1500 (or computer platform 1300 therein) may also determine a two-character prefix that identifies the tracking number as being associated with an Express Mail letter (or package) that is printable by user 1100 on a single-sheet label (step 6300). In one embodiment, computing platform 1300 may request a tracking number with a unique two-character prefix from Express Mail database 1560. Express Mail database 1560 then provides to computing platform 1300, the tracking number with the two-character prefix. Express Mail database 1560 may store additional information associated with the tracking number including at least one of the following: payment or fee information, a destination address, a user (or sender) address, delivery information, originating post office ZIP Code, day of delivery, time of delivery, date and time package or letter was provided to a post office for mailing, return receipt request, weight of letter or package, weekend or holiday delivery requests, amount of postage, insurance information, and COD requests (step 6400).

Computing platform 1500 may then provide to user 1100 the tracking number with the two-character prefix (step 6500). In one embodiment, the request for the tracking number may be provided to user 1100 through an interface adapted to provide (or solicit) tracking numbers. The interface may be in the form of an application programming interface or an interface (or plug-in) embedded in an Internet browser. Moreover, computing platform 1500 may provide the tracking number as part of a TCP/IP-based message exchange. Computing platform 1500 may also provide a printable image file with the tracking number. The image file may be printed by user 1100 on printer 2360, outputting a mailing label, such as depicted in FIG. 5.

Computing platform 1300 may also provide to a financial entity, such as a corporate accounting department or database therein, a record of the financial transaction associated with the tracking number (step 6600). For example, computing platform 1300 may provide a user's payment information, such as credit card information, to financial database 1570. Financial database 1570 may also credit any amounts received from a bank or credit card to the tracking number. Furthermore, computing platform 1300 may provide a copy of customer on-line receipt 4000 depicted in FIG. 4 to financial database 1570, where receipt 4000 may be stored.

In one embodiment, issuer 1500 is also a distributor of letters and packages. In that embodiment, when issuer 1500 delivers the letter or package with a tracking number that includes a unique two-character prefix, as described above, issuer 1500 may send an acknowledgment (or indication) to user 1100 through communication channel 1400. For example, the indication may be in the form of an electronic mail message with at least one of the following: the tracking number, date and time of delivery, person accepting the letter (or package), and destination address.

Although the description above refers to a single-sheet label for Express Mail, a skilled artisan would recognize upon reading the disclosure herein that delivery mechanisms other than Express Mail may be implemented instead.

The systems and methods disclosed herein may be embodied in various forms including, for example, a processor, such as computer 2000. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be well known and available to those of ordinary skill in the computer software arts. Examples of program instructions include machine code, such as produced by a compiler, and files containing a high level code that can be executed by the computer using an interpreter.

For purposes of the above discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files, etc. However, these and similar terms should be associated with appropriate physical quantities for computer operations. These terms are merely conventional labels applied to physical quantities that exist within and during computer operation.

What is claimed is:

1. A computer-implemented method for generating a mailing label to be affixed to a mail item, the method comprising:
    requesting, by a computer, a tracking number for the mailing label, the mailing label being printable by a user on a single-sheet medium, wherein the mailing label comprises the tracking number, the tracking number including a prefix that distinguishes the single-sheet mailing label from any other type of mailing label and indicates that the single-sheet mailing label was printed by the user rather than by some other means;
    receiving, by the computer, a response to the request, the response including an image file of the mailing label, the mailing label including the tracking number provided by a tracking number source;
    receiving, by the computer, a request from the user to print the image file of the mailing label with the received tracking number on a single-sheet medium;
    sending, by the computer, a receipt to the user, wherein the receipt is presented to a mail carrier at the time of mailing of the mail item and postmarked as proof of the mailing of the mail item; and
    sending, by the computer, the receipt and the tracking number to a financial institution, the receipt to be associated with the tracking number in a financial database maintained by the financial institution.

2. The method of claim 1, wherein the requesting further comprises:
requesting the tracking number through an interface that solicits a request for the tracking number from the tracking number source.

3. The method of claim 1, wherein the requesting further comprises:
requesting the tracking number through an interface, the interface adapted to identify that the tracking number is for the mailing label that is printable by the user.

4. The method of claim 1, further comprising:
printing the mailing label on the single-sheet medium, wherein the single-sheet medium is useable as an Express Mail label.

5. The method of claim 4, wherein the printing the mailing label further comprises:
printing the mailing label with an indication that postage is required.

6. The method of claim 1, wherein the receiving a request from the user comprises:
receiving a request from the user to print through an interface at a computer operated by the user.

7. The method of claim 1, further comprising:
receiving the tracking number with an indication that a credit card was charged.

8. The method of claim 1, wherein the receiving a request from the user further comprises:
receiving a request from the user to print when the image file is received.

9. The method of claim 1, wherein the receiving a request from the user further comprises:
receiving a request from the user to print the mailing label when the tracking number is received.

10. The method of claim 1, further comprising:
providing payment information, the payment information includes a credit card number.

11. The method of claim 1, further comprising:
requesting an acknowledgment of delivery based on the tracking number.

12. The method of claim 11, further comprising:
receiving the requested acknowledgement.

13. The method of claim 12, further comprising:
receiving a date with the delivery acknowledgement, wherein the date corresponds to when the letter was delivered.

14. The method of claim 1, further comprising:
mailing a label as the single-sheet medium.

15. A computer-implemented method for providing a computer-generated mailing label to be printed on a single-sheet medium and affixed to a mail item, the method comprising:
receiving, by a computer, a request for a tracking number;
determining, by the computer, whether the request is for a mailing label that is printable on the single-sheet medium;
generating, by the computer, an image file comprising the mailing label, the mailing label being printable by a user on a single-sheet medium, the mailing label including the tracking number, wherein the tracking number includes a unique prefix that distinguishes the single-sheet mailing label from any other type of mailing label and indicates that the single-sheet mailing label was printed by the user rather than by some other means;
storing, in a storage device, the determined tracking number;
providing, by the computer, the image file of the mailing label to the user;
providing, by the computer, a receipt to the user, wherein the receipt is presented to a mail carrier at the time of mailing of the mail item and postmarked as proof of the mailing of the mail item; and
providing, by the computer, the receipt and the tracking number to a financial institution, the receipt to be associated with the tracking number in a financial database maintained by the financial institution.

16. The method of claim 15, wherein the receiving further comprises:
receiving the request through an interface, the interface adapted to receive the request from a user.

17. The method of claim 16, wherein the receiving the request through the interface further comprises:
receiving payment information corresponding to the user.

18. The method of claim 17, wherein the receiving payment information further comprises:
receiving a credit card number for the user.

19. The method of 16, wherein the receiving the request through the interface further comprises:
receiving a ZIP code for a destination of a letter associated with the request.

20. The method of claim 15, wherein the determining whether the request is for the mailing label further comprises:
determining whether the request originated from an interface, the interface adapted to enable a user to print the mailing label on the single-sheet medium.

21. The method of claim 15, wherein the determining the tracking number further comprises:
providing a source database of at least one tracking number, with information identifying a user.

22. The method of claim 21, further comprising:
receiving a response from the source database, wherein the response includes the tracking number corresponding to the user.

23. The method of claim 15, wherein the unique prefix is a two-character prefix.

24. The method of claim 15, wherein the providing further comprises:
providing, through an interface, the determined tracking number, wherein the interface is adapted to print the mailing label on the single-sheet medium.

25. The method of claim 15, further comprising:
printing the determined tracking number on the single-sheet medium.

26. The method of claim 15, further comprising:
printing an Express Mail label on a single-sheet medium, the Express Mail label including the determined tracking number.

27. The method of claim 15, further comprising:
generating a mailing receipt.

28. A system for generating a mailing label to be affixed to a mail item, comprising:
at least one data processor; and
at least one memory comprising:
first code that generates a request for a tracking number for the mailing label, the mailing label being printable by a user on a single-sheet medium, wherein the tracking number includes a prefix that distinguishes the single-sheet mailing label from any other type of mailing label and indicates that the single-sheet mailing label was printed by the user rather than by some other means;
second code that receives a response to said request, the response including an image file of the mailing label, the mailing label including the tracking number provided by a tracking number source;
third code that, in response to a request from the user, prints the image file of the mailing label with the received tracking number;
fourth code that sends a receipt to the user, wherein the receipt is presented to a mail carrier at the time of mailing of the mail item and postmarked as proof of the mailing of the mail item; and fifth code that sends the receipt and the tracking number to a financial institution, the receipt to be associated with the tracking number in a financial database maintained by the financial institution;

wherein the at least one data processor executes the first, the second, the third, the fourth, and the fifth codes.

29. The system of claim 28, wherein the first code further comprises:

code that generates a request for a tracking number through an interface that solicits a request from the tracking number source.

30. The system of claim 28, wherein the first code further comprises:

code that requests the tracking number through an interface, the interface adapted to identify that the tracking number is for the mailing label that is printable by the user.

31. The system of claim 28, further comprising:

code that prints the mailing label on the single-sheet medium, wherein the single-sheet medium is useable as an Express Mail label.

32. The system of claim 31, wherein the code that prints further comprises:

code that prints the mailing label with an indication that postage is required.

33. The system of claim 28, wherein the third code further comprises:

code that enables the user to print through an interface at the at least one data processor.

34. The system of claim 28, wherein the second code further comprises:

code that receives the tracking number with an indication that a credit card was charged.

35. The system of claim 28, wherein the third code further comprises:

code that enables the user to print when the image file is received.

36. The system of claim 28, wherein the third code further comprises:

code that enables the user to print the mailing label when the tracking number is received.

37. The system of claim 28, further comprising:

code that provides payment information, wherein the payment information includes a credit card number.

38. The system of claim 28, further comprising:

code that requests an acknowledgement of delivery based on the tracking number.

39. The system of claim 38, further comprising:

code that receives the requested acknowledgement.

40. The system of claim 39, further comprising:

code that receives a date with the delivery acknowledgement, wherein the date corresponds to when the letter was delivered.

41. The system of claim 28, further comprising:

code that enables the user to print the mailing label for use with Express Mail.

42. A system for providing a computer-generated mailing label to be affixed to a mail item, the system comprising:

at least one data processor; and at least one memory comprising:

first code that receives a request for a tracking number;

second code that determines whether the request is for a mailing label that is printable on a single-sheet medium;

third code that determines the tracking number, wherein the tracking number includes a unique prefix that distinguishes the single-sheet mailing label from any other type of mailing label and indicates that the single-sheet mailing label was printed by a user rather than by some other means;

fourth code that stores the determined tracking number;

fifth code that provides an image file of the mailing label, the mailing label including the determined tracking number;

sixth code that provides a receipt to the user, wherein the receipt is presented to a mail carrier at the time of mailing of the mail item and postmarked as proof of the mailing of the mail item; and seventh code that provides the receipt and the tracking number to a financial institution, the receipt to be associated with the tracking number in a financial database maintained by the financial institution;

wherein the at least one data processor executes the first, the second, the third, the fourth, the fifth, the sixth, and the seventh codes.

43. The system of claim 42, wherein the first code further comprises:

code that receives the request through an interface, the interface adapted to receive the request from the user.

44. The system of claim 43, further comprising:

code that receives payment information corresponding to the user.

45. The system of 44, further comprising:

code that receives a credit card number from the user.

46. The system of 43, further comprising:

code that receives a ZIP code for a destination of a letter associated with the request.

47. The system of claim 42, wherein the second code further comprises:

code that determines whether the request originated from an interface, the interface adapted to enable a user to print the mailing label on the single-sheet medium.

48. The system of claim 42, wherein the third code further comprises:

code that provides a source database of one or more tracking numbers with information identifying a user.

49. The system of claim 48, further comprising:

code that receives a response from the source database, wherein the response includes the tracking number corresponding to the user.

50. The system of claim 42, wherein the third code further comprises:

code that determines the unique prefix as a two-character prefix.

51. The system of claim 42, wherein the fifth code further comprises:

code that provide the determined tracking number, wherein an interface for the fifth code is adapted to print the mailing label on the single-sheet medium.

52. The system of claim 42, further comprising:

code that prints the determined tracking number on the single-sheet medium.

53. The system of claim 42, further comprising:

code that prints an Express Mail label on a single-sheet medium, the Express Mail label including the determined tracking number.

54. The system of claim 42, further comprising:

code that generates a mailing receipt.

* * * * *

UNITED STATES PATENT AND TRADEMARK OFFICE
CERTIFICATE OF CORRECTION

| | | |
|---|---|---|
| PATENT NO. | : 8,600,907 B2 | Page 1 of 1 |
| APPLICATION NO. | : 11/879000 | |
| DATED | : December 3, 2013 | |
| INVENTOR(S) | : John F. Gullo | |

It is certified that error appears in the above-identified patent and that said Letters Patent is hereby corrected as shown below:

In the Claims:

Claim 51, col. 12, line 52, "code that provide" should read --code that provides--.

Signed and Sealed this
Twenty-seventh Day of May, 2014

Michelle K. Lee
*Deputy Director of the United States Patent and Trademark Office*